Patented Dec. 21, 1943

2,337,128

UNITED STATES PATENT OFFICE 2,337,128

NONDUSTING LITHARGE

Henry L. Plummer, Philadelphia, Pa., assignor to E. I. du Pont de Nemours & Company, Wilmington, Del., a corporation of Delaware No Drawing. Application January 27, 1942, Serial No. 428,374

10 Claims. (Cl. 23—146)

This invention relates to a non-dusting composition and more particularly to non-dusting litharge in a new and novel form.

Litharge is an important and much used material in various industries. It is an important raw material in the paint and synthetic enamel industry, in the ceramics industry and in the chemical manufacturing industry in general. The product is normally supplied as a very fine powder which because of its physical form is dusty. This is quite objectionable necessitating the use of special precautions in the handling of the material and sometimes the use of a substitute because of its toxic nature. Even with elaborate precautions the handling of the material is not free from objections from the dusting standpoint. Further because of the physical nature of the material it has a tendency to adhere to containers in which it might be stored, handled, weighed or measured, etc., thus likely causing loss or inaccuracies and possible later contamination of the immediate atmosphere. This again introduces a health hazard which it is highly desirable to avoid.

It has been proposed to briquette the powdered litharge but such a product made either without binder or merely wet with water before briquetting does not possess sufficient cohesion to be satisfactorily firm and non-dusting. If high pressures are used in the briquetting, the structure of the powdered litharge is changed so that it becomes difficult to react in subsequent operations in which it may be used. The use of other binders, such as glycerine and lead acetate, have been proposed but such products introduce various objections to the broad general use of the litharge in this form and are further not satisfactorily non-dusting.

I have now found that a satisfactory substantially non-dusting material may be produced which retains all the desirable and necessary properties possessed by the litharge in powdered form and which because of its substantially non-dusting property removes the industrial health hazard present in the use of the litharge in powdered form.

This invention therefore has as its principal object the provision of litharge in a substantially non-dusting form.

A further object is the provision of litharge in non-dusting form in which the other desirable properties of the litharge as color and reactivity have not been materially affected.

A still further object is the provision of litharge in a form such that the industrial health hazard attendant upon its use is substantially eliminated.

Another object is the provision of litharge in a substantially non-dusting form by a simple and economical procedure.

Other advantages will be readily apparent as the description of the invention proceeds.

These objects are accomplished by the present invention in which powdered litharge is admixed with a minor quantity of a substantially non-reactive petroleum still residue resin at a moderately elevated temperature, such mixture being briquetted or on cooling forming particles (agglomerates) of comparative uniformity of size.

The petroleum still residue resin used in the present invention is dark brown in color, opaque, heavily viscous to semi-solid in consistency, density substantially equivalent to water and containing from 15 to 20 per cent volatile matter. The product is known in the industry and marketed under the name of "Puro Resin" by the Pure Oil Company. It does not char at normal temperatures used in most baked enamels.

The invention will be more fully understood by the following example which is given by way of illustration but not limitation except insofar as defined in the appended claims. The parts are by weight.

Example

|                                | Parts |
|--------------------------------|-------|
| Powdered litharge              | 92.0  |
| Petroleum still residue resin  | 8.0   |
|                                | 100.0 |

The ingredients are charged into a suitably jacketed Werner and Pfleiderer mixer (or other convenient heavy duty mixer), heated to approximately 300° F. and then mixed until a homogeneous mass is obtained, the temperature being maintained during the mixing operation. The time of mixing will be governed largely by the amount or quantity of materials being mixed. For example a 10 pound lot required approximately 40 minutes mixing to produce a homogeneous mass. After the mass is allowed to cool to approximately room temperature, it is found to have assumed a form of irregular shaped (rounded with a rough surface) particles varying in diameter from about $\tfrac{1}{16}$ to $\tfrac{3}{16}$ inch but free from any tendency to dusting. The product is readily soluble in varnish and synthetic enamel vehicles, may be satisfactorily packaged, stored and shipped and handles satisfactorily when used in the production of a variety of types of compositions. As indicated the litharge in this form is free from dusting and has been found to retain this non-dusting property for a period of approximately one year. The desirable original properties of the litharge are not affected in any way either originally or on storage.

While it may be desirable to use the litharge in the form described above, if desired the mixture after partial cooling may be briquetted by suitable means into other desired forms or shapes. In such forms or shapes the litharge is equally as satisfactory with respect to non-dusting and the retention of the other desirable properties of litharge. Since the various means for briquetting or forming such material into pellets, etc. are well known, further description in this connection is not considered necessary.

Variations in the procedure for mixing the powdered litharge and the petroleum hydrocarbon still residue resin may be made without departing from the spirit or scope of the invention. For example, the resin may be first charged into the jacketed mixer, heated so that it becomes definitely fluid, the powdered litharge then added and then the mixing carried out at the desired temperature and for a sufficient time to produce a homogeneous mixture. A further variation or modification in the procedure may be made by charging the powdered litharge into the mixer heating it to the desired temperature, then adding the hydrocarbon resin and mixing as previously described. A still further modification is to treat the powdered litharge immediately after its manufacture with the resinous hydrocarbon using the residual heat of the freshly manufactured litharge either wholly or as a supplement to that necessary in the mixing operation. Other variations and modifications may be embodied in the present invention.

While a temperature of approximately 300° F., at which the litharge and resin are treated, has been found to be preferable, a range of from approximately 250° F. to approximately 385° F. has been found to be satisfactorily operable. A mixing temperature of substantially below 250° F. produces a mixture which is too sticky and difficult to handle whereas a temperature appreciably above 385° F. affects the chemical composition of the litharge.

While the example shows the use of 8 per cent of the petroleum hydrocarbon resin, based on the total composition, it has been found that a range of from 5-15 per cent of petroleum hydrocarbon resin may be used, the exact amount chosen being governed to a large extent by the particular procedure used in mixing and by other factors.

The products of the present invention are applicable to substantially all such uses to which powdered litharge is applied. Among such are use as pigments in decorative and protective coating compositions in which various film-forming materials are used, as catalyst in the treatment of oils, in the ceramic industry and in the chemical manufacturing industry in general. Many other uses will readily suggest themselves to those accustomed to using litharge in various manufacturing industries.

The principal advantage of the products described herein, over similar products heretofore used, is the substantial absence of dusting initially and on storage. Dusting is also substantially eliminated on handling the material, e. g. transferring from one container to another, thus eliminating loss in weighing or measuring and practically eliminating the industrial health hazard attendant upon the normal use of powdered litharge even with special safety precautions. While the litharge in the non-dusting form described herein possesses all the desirable properties possessed by powdered litharge, some of its properties, as for example solubility in a cooking varnish base, are enhanced. The non-dusting material is readily soluble in varnish as well as synthetic resin enamel film-forming vehicles commonly used in the industry. The products are further simple and economical to prepare.

The petroleum hydrocarbon still residue resin introduces no complications into the commercial use of the litharge. The resin is present in a minor proportion and being a substantially non-reactive material does not take part in or interfere with any other reactions in which the litharge may be used. Since the resin is readily soluble in organic film-forming materials, solvents and thinners, it readily blends with such materials when used in preparing decorative and protective coating compositions.

It is apparent that many widely different embodiments of this invention may be made without departing from the spirit and scope thereof, and therefore, it is not intended to be limited except as indicated in the appended claims.

I claim:

1. A non-dusting litharge consisting essentially of litharge and a minor proportion of a petroleum hydrocarbon still residue resin.

2. A non-dusting litharge composition consisting essentially of litharge and from 5 to 15 per cent of a petroleum hydrocarbon still residue resin based on the total weight of the said composition.

3. The product of claim 2 in which the petroleum hydrocarbon resin is present to the extent of about 8 per cent of the said composition.

4. The process of reducing the dusting of dry litharge which comprises mixing the same with a minor amount of a heavy viscous petroleum hydrocarbon still residue resin.

5. The process of claim 4 in which the resin is present in amount from 5 to 15 per cent based on the total weight of the mixture.

6. The process of claim 4 in which the resin is present to the extent of about 8 per cent based on the total weight of the mixture.

7. The process of claim 4 in which the materials are mixed at about from 250° F. to 385° F.

8. The process of claim 4 in which the ingredients are mixed at about 300° F. until the mass is homogeneous.

9. A briquette comprising litharge and from 5 to 15 per cent of a viscous petroleum hydrocarbon resin as a binder based on the total weight of the mixture.

10. A non-dusting litharge in the form of lumps having a diameter of from about $\frac{1}{16}$ inch to $\frac{1}{4}$ inch, comprising litharge and about 5 to 15 per cent of a heavy viscous petroleum hydrocarbon still residue resin based on the combined weight of the litharge and residue resin.

HENRY L. PLUMMER.